Figure 4:
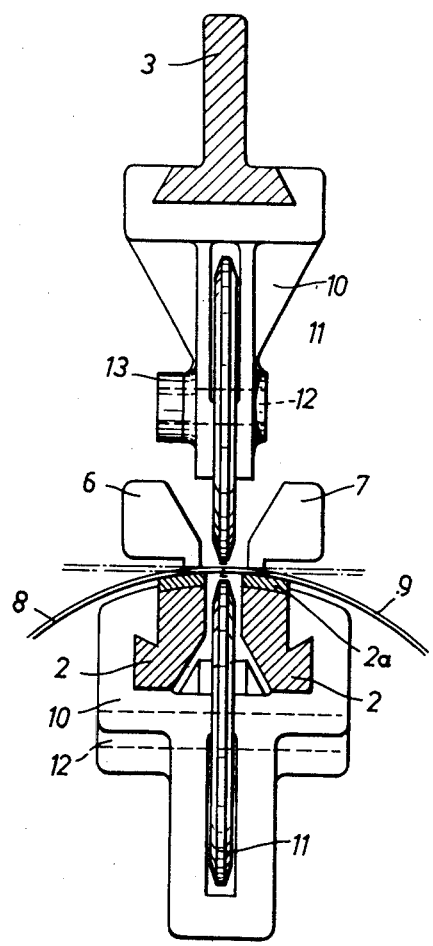

Nov. 5, 1957     F. BUSSE ET AL     2,812,417
METHOD AND MACHINES FOR PRODUCING A BUTT SEAM
JOINT BY MEANS OF RESISTANCE WELDING
Filed April 22, 1954     5 Sheets-Sheet 1
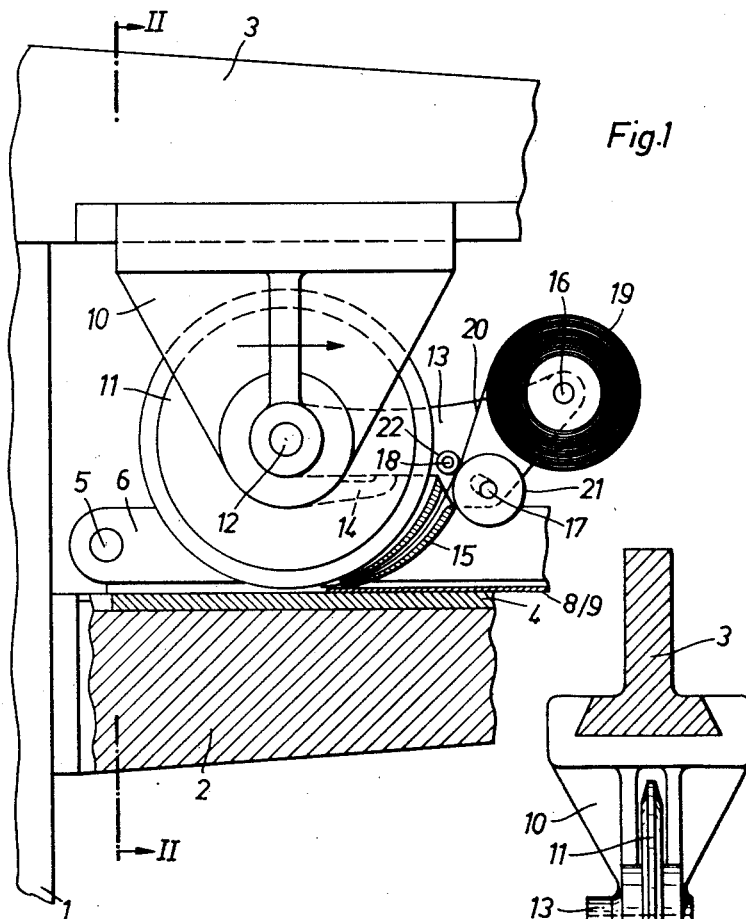
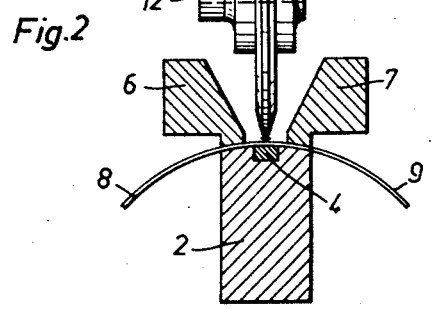
FERDINAND BUSSE
ALBERT SCHMITT
            Inventors,
By Silverman + Millin
            Attys.

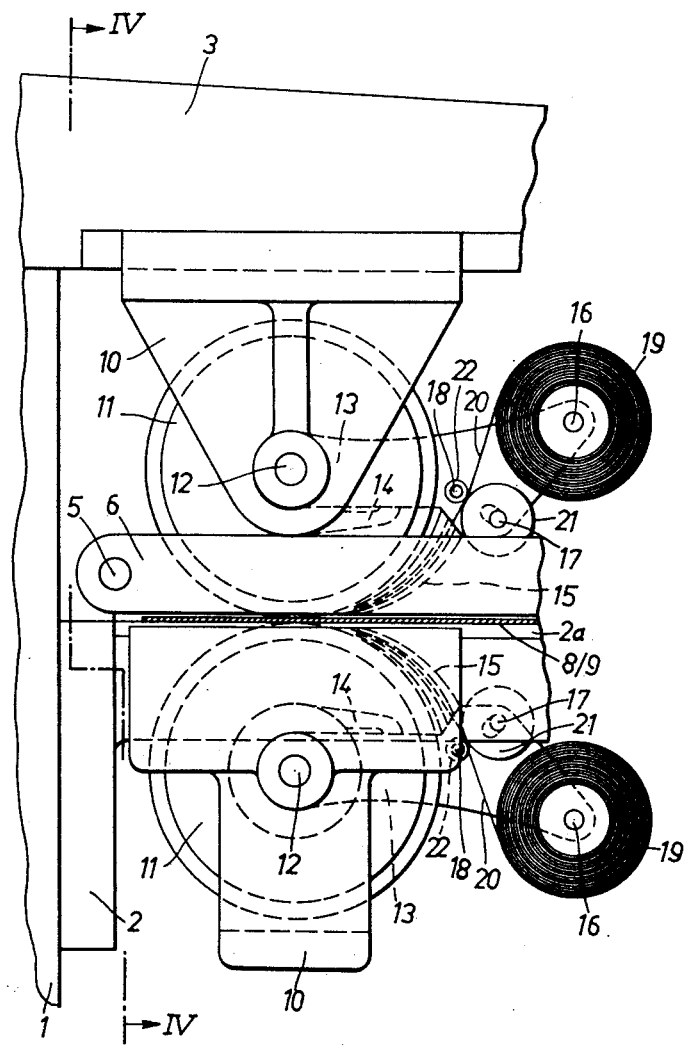

FERDINAND BUSSE
ALBERT SCHMITT
Inventors

FERDINAND BUSSE
ALBERT SCHMITT,
Inventors

United States Patent Office 2,812,417
Patented Nov. 5, 1957

2,812,417

METHOD AND MACHINES FOR PRODUCING A BUTT SEAM JOINT BY MEANS OF RESISTANCE WELDING

Ferdinand Busse and Albert Schmitt, Munich, Germany

Application April 22, 1954, Serial No. 424,998

6 Claims. (Cl. 219—82)

For producing a seam joint, e. g. of two plates or structural parts made of sheet iron, by means of resistance welding, if the plate edges to be joined are not overlapped, but abutting upon each other, butt seam welding machines are generally used. Such flash butt welding machines, however, being intended for comparatively large surfaces, are excessively expensive. Thus, endeavours have already been made with a view to passing two abutting plates through a normal roller seam welding machine. Yet the solidity thus obtained being very poor, the idea suggested itself to weld a narrow and thin strip of material upon the joint line. When adopting the method of first tacking said narrow strip upon the abutting plates by spots, e. g. by means of a spot welder, after which the stock to be welded is passed through a seam welder, or travelling welding heads are passed over it, certain defects will prove unavoidable, among which there is the difficulty of keeping the electrode rollers exactly on the joint line of the abutting plates, or on the strip of material tacked to them.

In order to remedy these inconveniences, the present invention relates to a method of producing a butt seam joint by means of resistance welding, by feeding appropriate material shaped as a narrow band or wire to the seam to be joined by butt welding, said method being characterized by guiding one electrode roller at the least along the seam over the abutting plates resting on a support and solidly clamped thereto, the two plates thus getting welded together on their tangent plane by the aid of a narrow band or wire fed by appropriate devices close to the point of support of the rollers and laid down in front of the electrode roller.

Besides, the invention comprises a machine for performing said method, which comprises two superimposed welding arms, a lower and an upper one, which are provided on the machine frame, and a clamping device for holding the abutting plates to be welded in their position on the lower welding arm, each of said arms being provided with an electrode on their respective surfaces facing each other, one at the least of said electrodes being shaped as an electrode roller guided on the respective arm in a longitudinally sliding motion.

Figure 5:
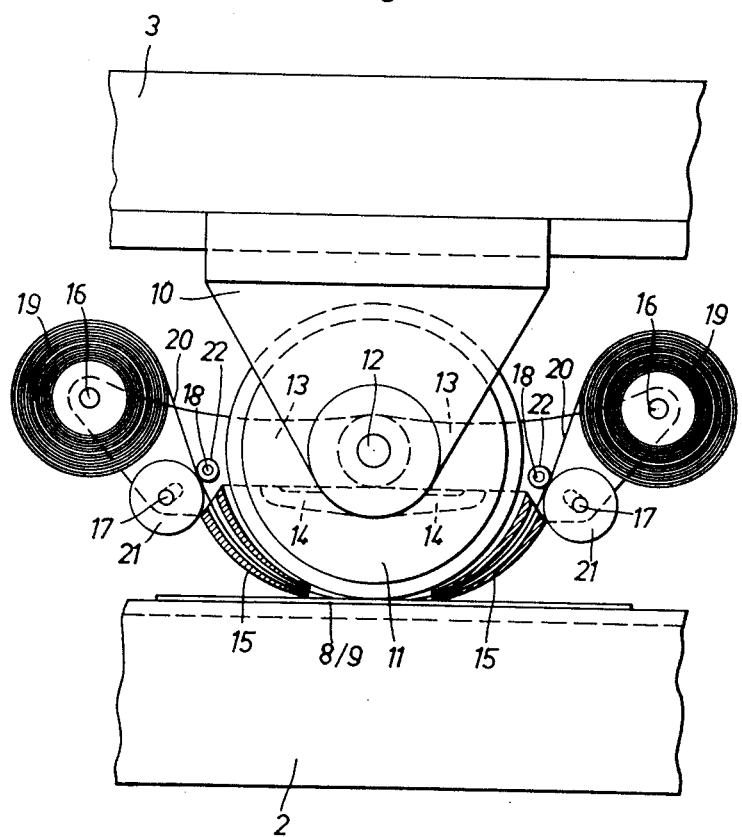
Figure 6:
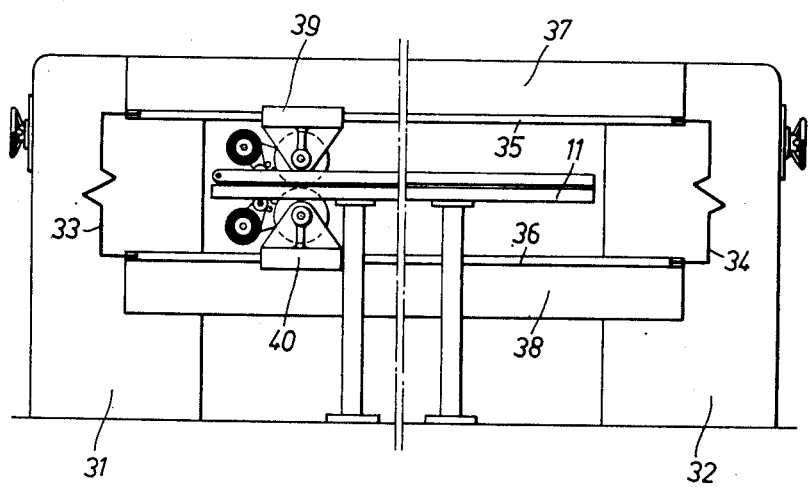
Figure 7:
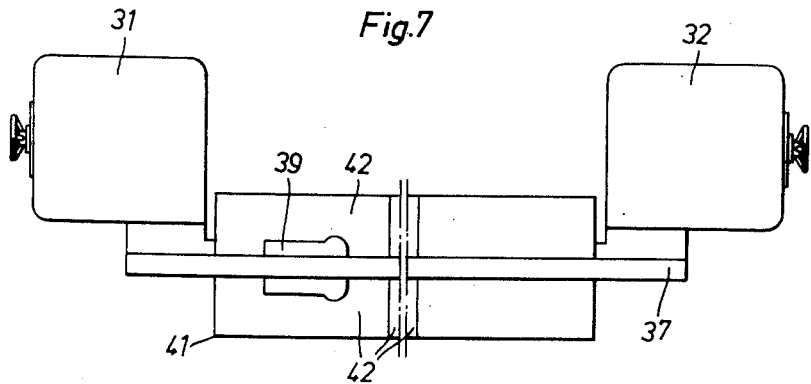

Furthermore, the invention relates to a method of producing a butt seam by means of resistance welding without any heavy clamping device being required, which method can be used preferably for welding operations comprising long welding seams. The reason is that for such welding operations as may comprise long welding seams heavy clamping devices are required, because otherwise, owing to the high welding pressure and the necessary welding heat, both of which are responsible for the quality of any resistance welding, with feeding of a flat or round wire, springing away of the plates to be welded together cannot be avoided. The method according to the invention is characterized by that fact that spot welding of the welding stock as well as the seam welding proper are performed on a resistance seam welding machine. Some more features of the present invention will be illustrated by the annexed drawing, which is only given by way of example and in which:

Fig. 1 shows an embodiment partially in section,
Fig. 2 a cross section along the line II—II in Fig. 1,
Fig. 3 a view of a second embodiment,
Fig. 4 a cross section along the line IV—IV in Fig. 3,
Fig. 5 a view of another embodiment with band or wire feed on either side,
Fig. 6 a view of the resistance seam welding machine for performing the welding operation, without any heavy clamping device being required, and
Fig. 7 a horizontal projection according to Fig. 6.

With the embodiment according to Fig. 1, two superimposed welding arms, a lower arm 2 and an upper arm 3, each of them being connected to a pole of a transformer (not shown) lodged in the casing of the machine 1 are arranged on that casing 1. The lower arm 2 comprises an electrode bar 4 arranged free at the top and the clamping bars 6 and 7 pivotally mounted on either side on a pivot 5 and holding the two abutting plates 8 and 9 destined for welding in their position after being placed on the electrode bar 4. On the upper welding arm 3, a welding head 10 having an electrode 11 is arranged in such a way as to be allowed, by means of a transmission over known means (e. g. a rack or worm), to perform a reciprocating gliding motion from end to end of the upper arm, pressing the electrode roller 11 against the bar 4, onto the welding stock 8 and 9 which has been put on said bar.

The electrode roller 11 can rotate freely on the axle 12, on which a bracket 13 is mounted so as to rotate freely. A stop 14 provided on the welding head 10 prevents the bracket 23 pivotally mounted from striking, together with the guiding duct 15, against the welding bar 4 and the material 8 and 9 destined for welding. On the bracket 13 a roller 19 bearing a narrow band strip 20 is rotatably mounted on a pivot 16.

This narrow band strip 20 can be introduced, with slight friction, between the two feed rollers 21 and 22 rotatably mounted on the axles 17 and 18, and then pushed into the guide duct 15. This latter ends direct before the point of contact between the electrode roller 11 and the electrode bar 4. The two plates 8 and 9 to be welded together are placed on the lower welding arm 2 in such a way, and held in this position by the two clamping bars 6 and 7 so that they keep abutting on each other on the electrode bar 4. The strip of material 20, which is to be welded with the two plates is fed, by turning the feed roller 21 by hand, to the point of contact between the electrode roller 11 and the electrode bar 4. The welding head 10 (Fig. 1), when in the starting position, stands direct close to the machine casing 1, and the electrode roller 11 presses against the electrode bar 4. The two plates 8 and 9 to be joined by welding are placed on the lower arm 2 and held in this position so as to keep abutting upon each other on the electrode bar. The strip of material 20 which is to be welded together with the two plates is fed to the point of contact between the electrode roller and the electrode bar by turning the guide pulley 21, which is done by hand.

At the same time, the bracket 13 pivotally mounted is slightly lifted, owing to which the strip of material 20 will be abut on the aforesaid point of contact, though the bracket does not yet touch the stop 14. Then the weight of the bracket, though light in itself, together with its roller, will exert a pressure on the strip of material projecting from the guide duct 15, which, when the welding head 10 is advanced in the direction of the arrow shown in Fig. 1, will prove strong enough to cause the electrode roller 11 to step upon the strip of material 20 and draw it, from that very moment, continuously off the winding-on roller, welding it at the same time upon the abutting plates from end to end. On the free end of the welding arms, the welding head 10 is stopped and the strip of material 20 lying between the guide duct 15 and the weld is severed. Then the welding head 10 will return into its starting position, and the plates joined by welding can be taken out of the machine. With the embodiment according to Figs. 3 and 4, the same reference numbers are used for the same elements as with the embodiment according to Fig. 1 and Fig. 2. The embodiment according to Figs. 3 and 4 differs from the first embodiment in the main by the fact that the electrode bar 4 provided in the lower welding arm 2 is replaced by electric roller fittings which, with regard to the horizontal plane laid through the weld, lie symmetrically to the electric roller fittings for the upper arm.

Hence, with the embodiment according to Figs. 3 and 4, both the upper arm 3 and the lower arm 2 comprise, each of them, an electrode roller 11 guided in such a way as to be longitudinally displaceable and rotating in a welding head 10 by means of a cross axle 12, a clamping lever 13 being articulated to the axle 12 and bearing a welding band roller 19 and a guide duct 15 destined to feed the band to the weld. As may be gathered from Fig. 4, the lower electrode roller 11 is arranged in a vertical opening of the lower welding arm 2, in such a way as to lie direct below the butt joint of the plates 8 and 9 secured for welding on the lower arm 2 by the clamping bars 6 and 7. The supporting face for each of the plates 8 and 9 on the lower arm 2 is formed by an insulating support 2a constituting the top part of the lower arm 2 and extending from end to end of said arm. The control of the welding heads 10 can be effected (in a way not shown in the drawing) with the aid of the means usually adopted, with rack or worm transmission, and in such a way that, while working, either of the welding heads will move on in the direction shown by the arrows in Fig. 3, said welding heads keeping steadily superposed with regard to each other.

With the embodiment according to Fig. 5 the same arrangement is provided as with the embodiments according to Figs. 1 and 2. In this case, the electrode roller 11 is mounted on a welding head 10 arranged on the upper arm 3 in a longitudinally displaceable position, whereas an electrode bar is provided in the lower arm 2. In contradiction to the embodiment according to Figs. 1 and 2, the embodiment according to Fig. 5 only differs by the welding head 10 comprising two feeds, each of them for a separate welding band lying in the direction of the displacement of the welding head, in front and to the rear of the electrode roller. Thus, in either direction of movement, the feed actually lying in the front can be used. As for the rest, the feed is contrived and arranged in a way analogous to the preceding embodiments. Here, too, the same reference numbers are used for the parts referring to the same elements; so we may leave off any further details concerning the second feed, this latter lying simply symmetrically to the first feed with regard to the vertical plane laid through the roller axle 12.

These embodiments, however, have proved useful only for performing comparatively short welding seams, since, owing to the high welding pressure and the necessary welding heat, both of which are responsible for the quality of resistance welding by feeding a flat or round wire, especially long welding seams will require voluminous clamping devices for the stock destined for welding.

In order to perform long welding seams, the plates destined for butt welding had hitherto been tacked, together with the strip of material, on a spot welder, after which the seam welding proper was performed on a roller seam welding machine. However, such tacking, apart from requiring an additional spot welder with wide projection, will meet with extraordinary difficulties if tacking is to be performed without the use of any clamping devices. Besides, such a method will by no means guarantee quick and safe mechanical welding.

All these inconveniences are remedied by the present invention, which, without requiring an additional spot welder and particularly heavy clamping devices, allows of realizing a butt seam on a resistance seam welding machine. It does not matter whether that seam welding machine is provided with fixed or movable electrode rollers, or with a movable electrode roller and a fixed electrode bar. The method according to the invention consists in a resistance welding machine performing both the spot welding operation and the seam welding proper. This can be done preferably by either passing the welding stock through the seam welder, or by passing the welding heads twice over the stock to be welded. During the first passing operation, the strip of material is tacked to the two plates destined for butt welding on their butt seam by spots at short distances, whereas the second passing operation only produces a continuous seam. The energy and/or welding speed during the tacking operation differs from the values required for the welding operation proper. It might also be possible to combine the tacking and welding operations into a single one; this, however, will require a more complicated and expensive machine. According to Figs. 6 and 7, the resistance welding machine for performing the method according to the invention consists of two casings 31 and 32 lodging the necessary welding transformers 33 and 34 and the controlling and driving elements. In order to compensate the welding current, the welding transformer 33 feeds, as usual, e. g. from the left, and the transformer 34 from the right to the upper or lower contact rails 35 and 36 arranged on upper and lower welding arms 37 and 38 connecting the casings 31 and 32. The movable welding heads 39 and 40, in active connection with the contact rails, are preferably driven simultaneously by a screw spindle (not shown). We need not go into the details of the structural features of the upper and lower welding heads, since they have already been described in the preceding embodiments. Between the two casings 31 and 32, a plate-shaped base 41 is provided, which constitutes the support for large metal sheets to be joined by welding. Between the front and rear halves of the base 41 a slot is provided, in which the lower welding electrode roller moves. The platform of the base 41 lodges the—preferably magnetic—clamping plates 42 required for holding the two plates in place and in a coplanar position.

The method according to the invention is performed as follows:

Into the slot provided in the platform of the base 41, preferably two gauges are introduced, which causes the one of the sheet metal plates, which is placed on the front half of the platform of the base 41 to come to lie exactly in the central alignment of the lower and upper welding rollers. This done, the magnetic front clamping device is switched in, which holds the sheet metal plate in place and in a coplanar position. The second plate, which is to be joined by welding with the first, is then placed upon the rear platform of the base 41 and displaced in such a way that its edge, which is to be welded, abuts on the opposite edge of the first plate. By switching in the corresponding magnetic clamping device, this plate, too, is held in place and in a coplanar position. This operation can easily be performed by one or two operators, without any troublesome adjustment of the plates being required.

At that phase, the double travelling roller fittings are in their initial position on the right side of the welding arms 37 and 38. During the first passing of the welding heads from their right starting position to the left end position (Figs. 6 and 7), the band or wire fed is spot-welded together with the plates to be joined by welding. By holding the plates in place and feeding the strip of material close to the weld, provision is made for the strip of material lying in exactly central alignment on the seam. The welding speed during the tacking operation is preferably higher than it is for the welding operation proper, which takes place during the subsequent return stroke. The welding energy, too, while tacking, differs from the values required for welding. The spot welding control of the welding current during the tacking operation, and the adaptation of the welding pressure to the stock to be joined by welding is effected in the usual way already known, just as well as changing over to the different welding speeds. During the tacking operation, the distance left between the individual tacks, the energy applied to tacking, and the welding speed is selected with a view to abstracting the heat from each tacking spot so quickly that the heat produced for each individual tacking spot both from the electrodes and the stock to be joined by welding is abstracted so quickly that there will not occur any bluing or oxidation of the surface of the tacking spot, and that no removal of any oxide coating on the tacking spots prior to seam welding proper will be required. If, e. g., the flat or round wire were spot-welded continuously from length to length and with lower values of pressure and energy than required for homogeneous welding, though with such a welding energy that the flat wire forms a solid unit with the plates to be joined by butt welding, these energy values will suffice for producing such an amount of heat as will cause bluing and oxidation of the flat wire tacked to the plates, with the result that its oxide coating would have to be removed under all circumstances before the subsequent seam welding.

Besides, there would be such an accumulation of heat in the plates to be joined by welding, that it would cause the plates to spring away on that part of their length which has not yet been pre-tacked. If, on the other hand, the flat or round wire is tacked at larger distances, this would no doubt do for holding the plates to be butt welded in their position, nor would there be any danger of bluing or oxidation of the wire surface, but another difficulty would then arise, that is to say that the wire tacked to the plates would get so hot during the second passing of the welding stock through the electrodes, or during the passing of the electrodes over the welding stock, i. e., while the continuous seam is being realized, that a sensible extension or elongation of the parts of the wire lying between two tacking spots would result, which cause doublings and swellings, without a blameless butt-seam being obtained.

Changing over, after reaching the actual return position, is effected automatically, in a known manner; so no additional attendance will be required. At the end of the tacking operation, the band or wire drawn off the roller on the welding head must be severed, since no additional band is required any more for the welding operation proper. When the double travelling roller fittings have returned to their initial position, i. e., after the weld proper has been performed, the welding operation is finished and the magnetic clamping devices can be switched off.

As it appears from the above statements, it is quite possible, by means of this welding method, to join single plates in continuous operation by butt seam welding, which will open many new fields of use, such as waggon building, etc.

Besides, it will of course be possible, by means of this welding method, to perform tacking and welding successively in a single passing operation.

We claim:

1. An automatic resistance type welding machine for welding together sheets of metal, which comprises, a support, a horizontal work surface provided on said support upon which a pair of sheets is adapted to be disposed for welding, means for positioning the sheets in physically abutted edge to edge relation with the resulting juncture disposed along a predetermined line transverse of said work surface, a pair of electrodes carried by said support and engaged respectively against the top and bottom of said juncture and aligned with said predetermined line, means for clamping the sheets substantially along the length of their juncture and adjacent said juncture, at least one of said electrodes being a roller and the support having roller mounting means having said roller rotatively journalled therein on a horizontal axis normal to said predetermined line and disposed to press against said juncture at a tangential point of said roller, means upon said roller mounting means for carrying a quantity of flexible metal welding strip, means for confiningly guiding said strip from said carrying means to a position immediately adjacent said tangential point and centered over said juncture, and driving means causing relative movement along said line between said work surface and at least said roller, whereby when an end of said strip is initially pinched between said roller and the juncture, the said relative movement will cause said strip to be pulled from said guiding means and fed directly upon said juncture along the length of said line as a weld is being made, said bottom electrode comprising a second roller, second roller mounting means provided on the support having the second roller journalled therein on an axis parallel to that of the first roller and aligned with the first roller, the second roller being disposed to press against the bottom of the juncture at a second tangential point of the second roller directly opposite said first tangential point of the first roller, second means for carrying a second quantity of flexible metal welding strip upon the second roller mount means and a second means for confiningly guiding the second strip to a position immediately adjacent said second tangential point, whereby during said relative movement, there is a second strip also applied to the bottom of said juncture for welding thereto.

2. An automatic resistance type welding machine as claimed in claim 1 in which the horizontal work surface is fixed relative to the support, and there is a slot in the same along the length of said line, the second roller having its edge protruding through said slot and adapted to engage against the bottom of said juncture, and in which means are provided for simultaneously moving both of said roller mounting means along said predetermined line to cause said welding.

3. An automatic resistance type welding machine for welding together sheets of metal, which comprises, a support, a horizontal work surface provided on said support upon which a pair of sheets is adapted to be disposed for welding, means for positioning the sheets in physically abutted edge to edge relation with the resulting juncture disposed along a predetermined line transverse of said work surface, a pair of electrodes carried by said support and engaged respectively against the top and bottom of said juncture and aligned with said predetermined line, means for clamping the sheets substantially along the length of their juncture and adjacent said juncture, at least one of said electrodes being a roller and the support having roller mounting means having said roller rotatively journalled therein on a horizontal axis normal to said predetermined line and disposed to press against said juncture at a tangential point of said roller, means upon said roller mounting means for carrying a quantity of flexible metal welding strip, means for confiningly guiding said strip from said carrying means to a position immediately adjacent said tangential point and centered over said juncture, and driving means causing relative movement along said line between said work surface and at least said roller, whereby when an end of said strip is initially pinched between said roller and the juncture, the said relative movement will cause said strip to be pulled from said guiding means and fed directly upon said juncture along the length of said line as a weld is being made, said roller mounting means having a second means carrying a second quantity of flexible metal welding strip and second means for confiningly guiding the second strip to the said tangential point, but from the side opposite the first guiding means whereby the second strip may be laid down upon the juncture if the said relative movement is in an opposite direction.

4. An automatic resistance type welding machine for welding together sheets of metal which comprises, a support having a mandrel for receiving thereon a pair of sheets for welding, means for aligning the sheets upon the mandrel in abutted edge to edge relation with the resulting juncture disposed along a predetermined line on said mandrel, means for clamping the sheets in such relation, welding current applying means including a pair of current passing electrodes at least one of which comprises a roller, respectively disposed above and below the mandrel surface and adapted to engage the said juncture between them for passing current through the abutted edges of said sheets, a welding current carrying rail spaced above said mandrel and parallel with said predetermined line and a head slidably mounted on said rail and having said roller rotatably mounted thereon on a horizontal axis normal to the said predetermined line, driving means for driving said head along the length of the rail in one direction and for driving the said head along the length of the rail in the opposite direction, a bracket attached to and movable with said head and having welding strip roll carrying means thereon, said bracket having guide means for leading the welding strip from said roll carrying means to the point of engagement of said roller with said juncture whereby to apply said strip to said juncture during welding as the roller rolls over the juncture, said current applying means including current control means for selectively applying intermittent tacking welding current to said electrodes during movement of said head in one direction, and for applying a continuous seam welding current to said electrodes during said movement in said opposite direction.

5. An automatic resistance type welding machine as claimed in claim 4 in which the second electrode is also a roller mounted on a second head for movement with the first head and having a second bracket, second roll carrying means, second guide means, and adapted to apply a second strip to the bottom of the juncture during welding, said mandrel having a slot along the length thereof, and the second head being disposed to have the second roller protrude through the slot and up against the bottom of the said juncture.

6. A method for electrically welding a pair of sheet members along a butt seam weld in a resistance welding machine which has a table surface, a pair of electrodes on opposite sides of the table surface and adapted to engage the sheet members along a predetermined line fixed relative to the machine, at least one of the electrodes comprising a roller, which comprises: arranging the sheets upon said table surface in abutting engagement with the edge to edge juncture on said predetermined line and clamping the said sheets substantially along the length of said juncture adjacent the same, rolling a strip of welding material upon said juncture with said roller in one pass while applying pressure upon said roller and intermittent tacking welding current between said electrodes, said rolling step being accomplished at a predetermined speed of movement, rolling the said roller back over said tacked strip in a second pass at a predetermined speed of movement while applying pressure and continuous seam welding current between said electrodes.

References Cited in the file of this patent

UNITED STATES PATENTS

| 1,083,956 | Thomson | Jan. 13, 1914 |
| 1,213,422 | Sacek | Jan. 23, 1917 |
| 1,308,778 | Gravell | July 8, 1919 |
| 2,023,086 | Lavallee | Dec. 3, 1935 |
| 2,071,418 | McBerty | Feb. 23, 1937 |
| 2,421,716 | Rose | June 3, 1947 |

FOREIGN PATENTS

| 25,209 | Denmark | Nov. 24, 1919 |
| 369,901 | Germany | Feb. 24, 1923 |
| 918,650 | Germany | Sept. 30, 1954 |